(12) United States Patent
Lambert

(10) Patent No.: US 7,698,747 B2
(45) Date of Patent: Apr. 13, 2010

(54) APPLET DOWNLOAD IN A COMMUNICATION SYSTEM

(75) Inventor: Jean-Marc Lambert, Buc (FR)

(73) Assignee: Gemalto SA, Meudon (FR)

( * ) Notice: Subject to any disclaimer, the term of this patent is extended or adjusted under 35 U.S.C. 154(b) by 1105 days.

(21) Appl. No.: 10/497,946

(22) PCT Filed: Dec. 12, 2002

(86) PCT No.: PCT/IB02/05483

§ 371 (c)(1),
(2), (4) Date: Aug. 30, 2004

(87) PCT Pub. No.: WO03/051080

PCT Pub. Date: Jun. 19, 2003

(65) Prior Publication Data

US 2005/0021937 A1    Jan. 27, 2005

(30) Foreign Application Priority Data

Dec. 12, 2001  (EP) .................................. 01129626

(51) Int. Cl.
*G06F 17/30* (2006.01)
*H04L 9/32* (2006.01)

(52) U.S. Cl. .................... 726/29; 713/151; 713/176; 713/189

(58) Field of Classification Search .................. 713/151
See application file for complete search history.

(56) References Cited

U.S. PATENT DOCUMENTS

| | | | |
|---|---|---|---|
| 6,546,377 B1* | 4/2003 | Gravell et al. ................. | 705/60 |
| 2002/0073309 A1* | 6/2002 | Kurn et al. .................. | 713/155 |
| 2002/0160745 A1* | 10/2002 | Wang .......................... | 455/404 |
| 2003/0003953 A1* | 1/2003 | Houplain ..................... | 455/553 |

* cited by examiner

*Primary Examiner*—Benjamin E Lanier
(74) *Attorney, Agent, or Firm*—Pehr B. Jansson; The Jansson Firm

(57) ABSTRACT

A system comprises a first communication device and a second communication device. The first communication device is arranged to communicate with the second communication device via a communication network using a first communication protocol. The first communication device is arranged to send a message to the second communication device via the communication network using the first communication protocol. The message is designed for a second communication protocol. The second communication device is arranged to send the message to a third communication device. The third communication device is being arranged to understand the second communication protocol.

19 Claims, 8 Drawing Sheets

| SIM CARD | INTERFACE DEVICE | ClientSide Applet (wCSApplet) | CLIENT PC | WEB SERVER | MESSAGE GENERATOR |
|---|---|---|---|---|---|
| CONTENT: <br><br> SIM PIN Code <br> SIM OTA Kic key <br> SIM OTA Kid key <br> Synchro Count <br><br> ICCID <br> MSISDN <br> IMSI <br> ... | Can be a SmartCard reader, a Mobile phone linked via Infrared, Bluetooth, Contactless interface, USB... | Executable code that is run in the context of the Web browser. <br> This code is accessing the Card interface device with the right middleware. | WEB Browser. Interface to a Card accepting device | WEB Server implementing dynamic page construction. This server is interfaced to the Message Generator using a Application Programing Interface (API) providing all the required methods to implement the application. | The message generator is containing a repository (Database) that contains, for each subscriber (SIM) all the required data for its management. <br> ICCID, MSISDN, IMSI <br> The Synchro Count is used as an anti-replay mechanism. <br> The Keys are also stored in that database $Kid_{ota}$ and $Kic_{ota}$ |
| Message security Check : The message generated by the MSG Generator is secured using the 3.48 layer. This is making use of 2 keys (Signature and Encryption) and a Synchro count that is used as an anti-replay mechanism : to be accepted by the SIM, a received message must contain a synchro count greater that the reference stored in the card. This value is updated at each new message. | TRANSMIT/ RECEIVE APDUs to/from the SIM | This applet is also in charge of preparing the envelop commands and get the execution status. <br><br> This applet can also implement a card analysis to update the Msg generator database with the last status of the card, in case a communication problem occured. | It displays the HMML pages to the user. | | The Message generator role is to generate the required APDUs to implement a service. <br> It is also providing a 3.48 layer encapsulation for the End to end security scheme. <br> The Message generator is also optimising the necessary commands to perform the service, as it knows the actual status of the SIM Card content. |

Figure 5A

| Vector used | SMS acknowledgement requested (RL=09) | No SMS acknoledgement requested(RL=0) |
|---|---|---|
| Serial or USB smart card reader or USB cable | Impossible as the card is not in the mobile handset and therefore cannot send SMS. Use of this option may produce unwanted side effects. | Right choice |
| Infra red link Blue tooth link | Use this option if we want the mobile to acknowledge the reception of the message via SMS | Use this option if the acknowledgement of the message will be transmitted to the SMS message generator via Internet |

Figure 6 :

Summary of possible options regarding the setting of the reply level field

APPLET DOWNLOAD IN A COMMUNICATION SYSTEM

FIELD OF THE INVENTION

The invention concerns the downloading of applets in a communication system.

The communication system includes a first communication device and a second communication device. In this system, The first communication device is arranged to communicate with the second communication device via a communication network using a first communication protocol. The first communication device is arranged to send a message to the second communication device via the communication network using the first communication protocol.

The system can be, for example, a mobile communication system that is arranged to administrate applications and files in a SIM (Subscriber Identity Module) card.

BACKGROUND OF THE INVENTION

The ETSI (European Telecommunication Standards Institute) GSM (Global System for Mobile communication) 3.48 (or 3.40) standard defines the commands required to administrate remotely the files and applications resident on a SIM card. The underlying communication channel is the SMS (Short Message)

The 3.48 standard also specifies the security protocols to be used for such messages.

When installing applications on a Smart card in a reader, keys are distributed to the local PC to allow the key presentation to the card.

SUMMARY OF THE INVENTION

It is an object of the invention to have a system which is more simple.

According to an aspect of the invention, a system comprising a first communication device and a second communication device, the first communication device being arranged to communicate with the second communication device via a communication network using a first communication protocol, the first communication device being arranged to send a message to the second communication device via the communication network using the first communication protocol, the message being designed for a second communication protocol, wherein the second communication device is arranged to send the message to a third communication device, the third communication device being arranged to understand the second communication protocol.

The first communication protocol can be, for example, an IP based protocol.

The second communication protocol can be, for example, a security protocol which is part of the ETSI GSM 3.48 standard.

The second communication device can be, for example, a personal computer PC, a PDA, etc.

The third device can be, for example, a SIM card.

The message can be, for example, a secured SMS (Short Message Service) message.

According to the invention, no keys need to be distributed in personal computers because the secured SMS message is sent as such to the SIM card.

Thanks to the invention, the system is more simple and more sure.

BRIEF DESCRIPTION OF THE DRAWINGS

In order to simplify the description, in the drawings the same elements have the same references.

FIG. 5A, 5B, 5C are sequence diagrams of operations for access to SIM cards services via a Web connection.

FIG. 6 summarizes possible options regarding the setting of a reply level field.

The invention will be better understood by reading the following description, given as an example and in reference to the appended drawings.

DETAILED DESCRIPTION

The ETSI (European Telecommunication Standards Institute) GSM (Global System for Mobile communication) 3.48 (or 3.40) standard defines the commands required to administrate remotely the files and applications resident on a SIM card. The underlying communication channel is the SMS (Short Message)

The 3.48 standard is also specifying the security protocols to be used for such messages.

When installing applications on a Smart card in a reader, keys are distributed to the local PC to allow the key presentation to the card.

But, the applet download and the file management can be done on another channel, i.e. Internet.

One aspect of the invention is to make use of the 3.48 specification and use it on a different communication channel, i.e. Internet.

The system that will compute the 3.48 message will manage the construction of the messages and the management of the security.

The transport layer will take care of the distribution of the messages to the card by the other channel.

In the Internet case, the system will make use of a web server that will request and receive the 3.48 messages, a web client equipped with a Smart Card accepting device (Reader) connected to the client. The reader will hold the SIM card during the SMS (Short Message Service) transfer operation.

A SMS message is a text message service that enables short messages to be sent and transmitted from a cell phone. A SMS operation enables the transmission of text messages between mobile phones and other systems such as, for example, electronic mail, paging and voice mail.

The smart card accepting device can be, for example, a mobile handset equipped with a SIM card. The SMS messages, for example, a SMS command message, are downloaded from the client PC (Personal Computer) to the SIM card via an infra red connection.

The invention provides, in particular, the following advantages:

Use of GSM 03.48 format

The same security is used across the distribution channel

There is no need for key distribution, and this results in an enhanced security by reducing the risk of key piracy.

The keys are kept on the server side in a secured storage area.

Figure 1:
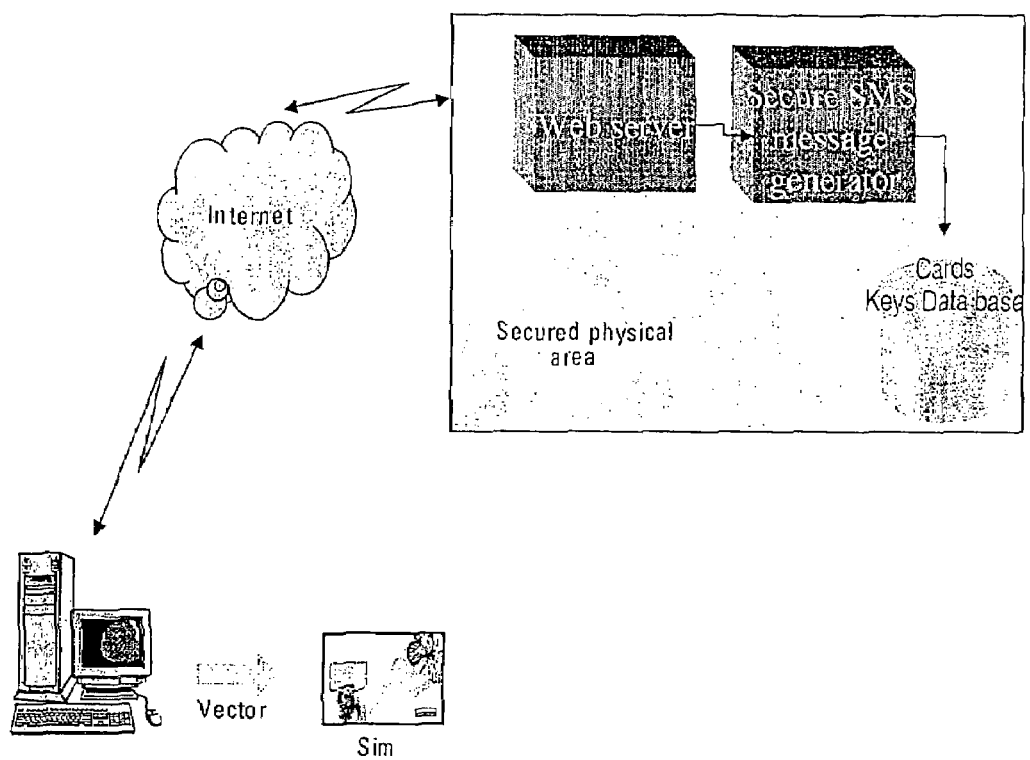
FIG. 1 is the global architecture of the system.

The intelligence in the client computer is limited.
Use of Mobile Infra red connection:
Possibility to perform operations on the card (sending applet, or configure the card) without removing the smart card from the handset.
The overall architecture of the system is described on FIG. 1.

A secured physical area comprises:
A database containing OTA (Over The Air) keys for the SIM cards of he subscriber's SIM cards.
A Secure SMS message generator. Its role is to generate the 3.48 formatted messages, which will be transmitted to the end user SIM Card. The generation of those messages requires the knowledge of OTA keys of the end user SIM card, which are stored in the key database.
A web server which will transmit the secure SMS messages over the internet In our illustrated example, the system further comprises a client PC arranged to communicate to a SIM card, using a vector device and/or a vector channel. The PC will receive the transmitted SMS messages and will send them to the SIM cards via the vector channel.

The vector device can be, for example:
A smart card reader connected to the PC serial or USB (Universal Serial Bus) port.
An infrared enabled mobile handset. In this case the SMS messages are sent via the infra red link between the PC and the mobile handset.
A Bluetooth® enabled mobile handset. In the case the SMS messages are sent from the PC to the handset via the blue tooth connection.
An USB cable connecting an USB enabled SIM to the USB bus of the PC.
A contact less reader in the case where the SIM card has a dual mode interface.

Example 1: Infra red interface with a SIM card inserted in a mobile.

SIM cards services aim at providing the user with SIM card related value added services. Those services may need the installation of an applet on the card, giving access to extra functionality. Some services may help the user to configure its card, or upload or download data from/to it.

Some mobile handsets are equipped with an infrared port. The purpose of the port is usually two fold:
It allows a remote control of the handset via the Infra red port from an external device (portable PC or PDA (Personal Digital Assistant)).
It enables to use the handset for sending and receiving SMS message from an external device such as a portable PC or a PDA.

In the illustrated example, the interaction between the external device and the handset is done by means of AT commands. Those commands have been standardized by the ETSI in 2 recommendations:
GSM07.07 (AT command set for GSM mobile equipment), and GSM 07.05 (equipment interface for short message services and cell broadcast services).

Using the AT commands described in the GSM 07.05 recommendation, it is therefore possible to send an SMS message to the mobile via the Infra red interface. This is done using the 2 steps AT command AT+CMGW as described in GSM 07.05.

When a message is sent to the mobile using this interface, the mobile acknowledge the reception of the message and pass it to the SIM card for storage in a file named AF SMS file as described in the GSM 11.11 recommendations. However, in our example, before being handed to the SIM, the SMS message is prepended with a status byte indicating its origin.

Figure 2:
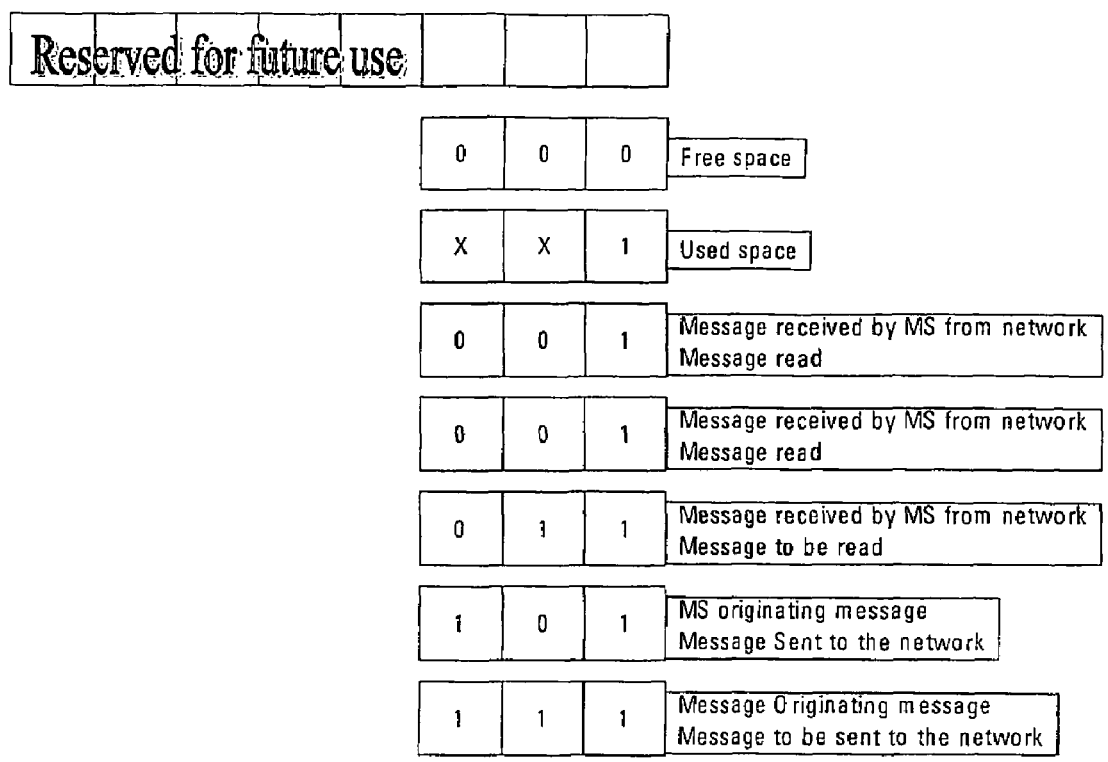
FIG. 2 is the meaning of the status byte of the SMS message.

FIG. 2 indicates the meaning of the status byte. In the illustrated example, when a message is received by the mobile via the infrared port, it is passed to the SIM card with a status byte of either 05(1 0 1) or 07 (1 1 1) depending on the optional parameter STAT passed to the AT+CMGW command.

The SIM card then process the TPDU (Transport Protocol Data Unit) of the message and if the TP Protocol Identifier field of the SMS message is 41 or 7F, it will recognize the SMS message as a command carrying one and will attempt to execute the card commands.

However, in order for this to happen, the SIM card Operating system software must enable the processing of SMS messages with Status by 05 or 07. Otherwise the SMS message will just be stored in the EF (Elementary File) SMS memory.

The download of applications to the mobile via the SIM port is more efficient than the OTA (Over The Air is Schlumberger's Trademark) download because there is no bandwidth bottleneck. Furthermore it is not likely to be the origin of a congestion of the SMS channels. So in some cases, access to the SIM card by the infrared channel may be more attractive that OTA access.

Specification of the Reply level field:
The RL field is part of the 03.48 header. It specifies the reply level wanted to acknowledge the SMS message.

Care must be taken to set this field appropriately when sending Command SMS message to the SIM card via the infrared interface.

In our example, setting the reply level to 00 will prevent the mobile to try to send acknowledgement messages to the SMS center to indicate it has received and processed the message. In our example, setting the RL field to 9 will enable the sending of the acknowledgement SMS message.

Care must be taken when constructing the message to set the RL field appropriately. Preferably, an acknowledgement message will be requested whenever we want the message reception to be acknowledged by SMS.

Example 2: An Application of the invention could be the access to SIM card services via a web connection:

This application consists in accessing SIM card services via, for example a PC connected to the SIM card, by one of the means mentioned above.

In our exemplary embodiment, the process of invention comprises the following initialization steps:

$1^{st}$ step: The end user working in front of his PC starts his web-browser and connects to the web site of his operator. Among the choices, some "SIM Card services" are proposed.

$2^{nd}$ step: User is clicking on "SIM cards services" A new page is proposed to invite the user to insert/connect his SIM card in the PCs peripheral.

$3^{rd}$ step: The web page contains a signed applet (the middleman) which, can be installed and remain on the PC and which will enable the connection to the SIM card via the vector channel. This applet will make the interface between the SIM card and the remote web server. It will first retrieve and send to the remote server the identification of the SIM card.

$4^{th}$ step: The user is requested for his PIN number to unlock locally the card access.

$5^{th}$ step: The User selects his SIM card service. Some services can be fully managed locally within the applet. Some other services are requiring more security to access the card. Let's assume, the user select an "applet download". This will trigger the installation of a new application can be installed on the SIM Card.

6th step: the web server receives the request, route the request to the Secure Message Generator which accesses the database holding the description of the end user SIM card, including the appropriate OTA keys 7th step: The user is proposed a list of available applets for his SIM and selects one such applet for download. The request is routed from the user browser to the remote web server via the Internet 8th step: the web server requests the generation of the set SMS messages corresponding to the applet from the secure SMS generation module. The SMS generated are using the ETSI 3.48 standard to secure the messages. The secret key used for that computation is only known by the SMG and the SIM card itself.

9th step: the messages are encapsulated in a Html Page and sent to the user browser to the attention of the middleman applet 10th step: the browser applet processes the SMS and generate "envelop" commands to transmit the SMS to the SIM. The envelope command is standard in ETSI. The applet is also gathering the processing status and replies of those SMS. These statuses and replies will be used by the SMG to memorize the status of the card. (Install with success, list of applet already installed, failure . . . )

11th step: The statuses and replies are sent to Secure message generator via the web server.

12th step: Once the download is completed, the user is informed of the success of the operation Inform the user of success or failure of the operation via a status page which will be displayed in his web navigator.

If the PC is integrated in the mobile, then the Internet browser of the mobile is used to access the smart card.

This is not changing at all the benefit and usability of the solution.

Setting of the Reply level field:

In this type of application the setting of the Reply level field will depend on the type of vector used to send the SMS message to the SIM card as well as the chosen vector to acknowledge the reception of SMS messages. The different alternatives are summarized in FIG. 6.

Figure 3:
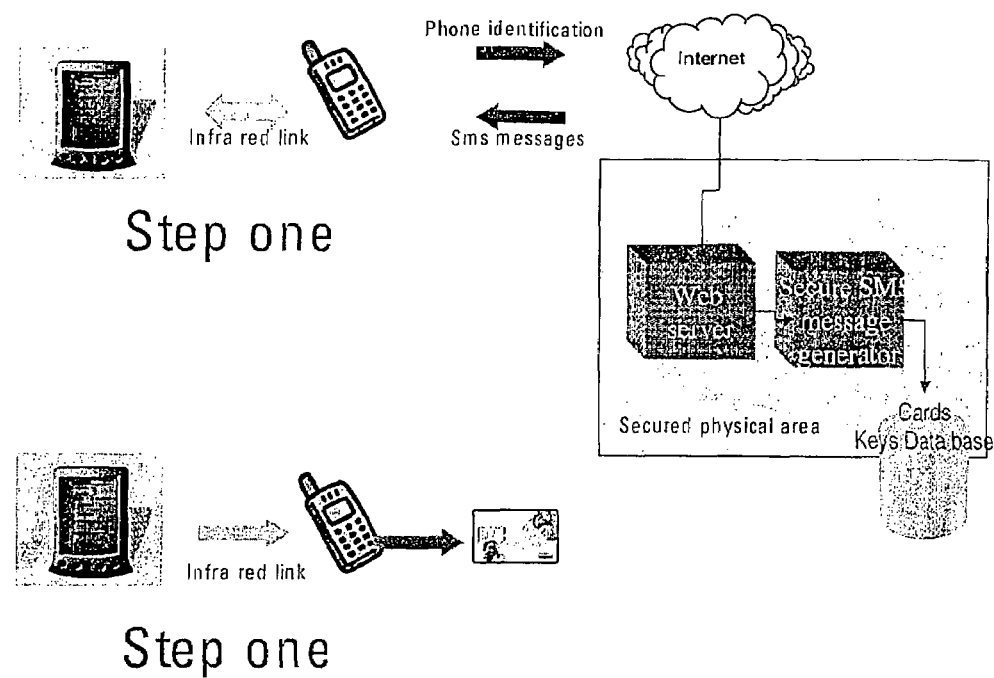
FIG. 3 is a schematic view of the access to SIM card services using a PDA via an Infrared connection.

Example 3: Another Application of the invention could be an access to SIM card services by using a PDA via an infra red connection In this application, the user accesses the SIM card services via a two phase processes as described on FIG. 3. In a first phase, the user first downloads the SMS messages to his handhelp PC, and then transmits them from the PDA to the SIM card via the infra red interface.

In this embodiment, the various steps of the operations could be as follows:

1—The user connects to the internet with his PDA. One way to do that is to use a mobile phone linked to the PDA with an infrared connection, but this is not the only way.

2—The user connects to the web site of the operator with the web browser on his PDA and authenticates himself. One way to achieve this is to enter his phone number. An SMS message will be sent back to his mobile with a code. The user must enter the code in the web browser of the pda in order to be given access to the SMS card services. There may be other ways to authenticate the user.

3—Upon the first connection, the user will download an application: "The SIM uploader" which can be installed on his PDA. This application will enable to retransmit the SMS messages from his PDA to the SIM card installed on his mobile handset by means of the infrared channel.

4—Once authenticated, the user will select the applet to download and initiate the download to his handhelp pc.

5—After downloading the applet to his PDA, the user disconnects from the internet and starts the SIM uploader application. This application will read the SMS messages previously stored on the PDA and send them to the mobile via the infra red interface.

6—The mobile handset acknowledges the reception of the messages and passes them to the SIM card for processing.

7—The SIM card processes the SMS messages and executes the commands. The SMS messages are formatted with a reply level of 09 indicating that acknowledgement SMS message are requested. So the mobile phone will send acknowledgement messages for each SMS received.

8—The operator receives the acknowledgement messages sent by the mobiles and can monitor the installation status of the application on the SIM card to the cards of its users.

Example 4: another application of the invention could be the access to SIM cards services via interactive infra red or blue tooth distribution points This describes an application where the user accesses the SIM cards services via the use of Infra red or blue tooth interactive distribution points. Those points may be located in public area such as shopping centers, airports, train stations, or in private areas such as the hall of a large corporation depending on the type of service proposed.

Figure 4:
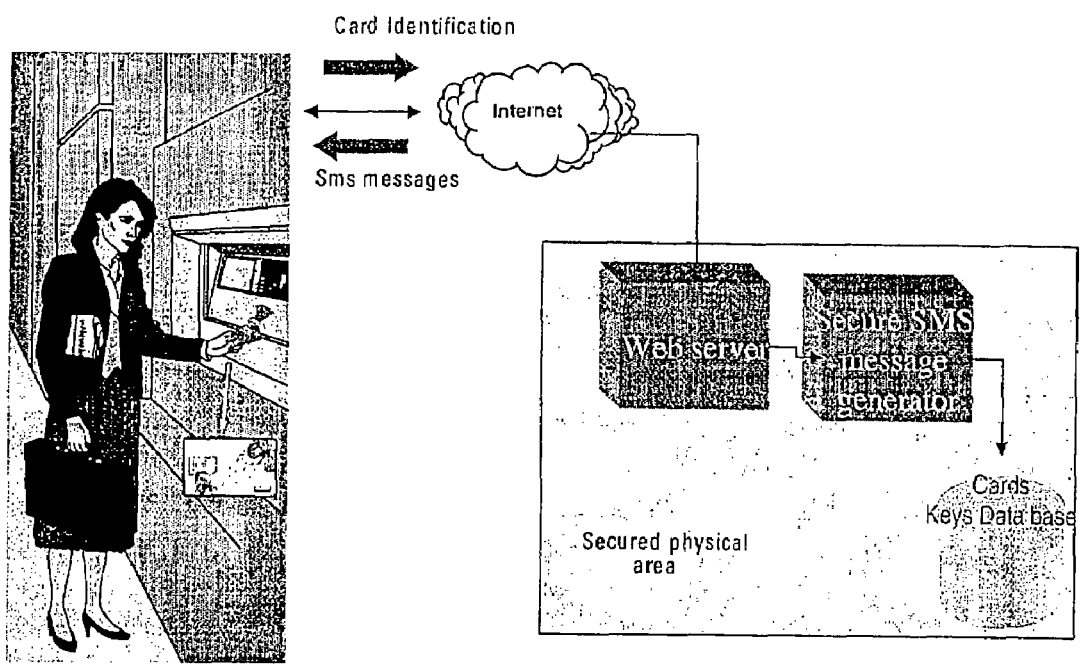
FIG. 4 is a schematic view of the access to Card services via interactive distribution points.

The architecture of the application is summarized on FIG. 4. The overall principal is very similar to the previous application. Only the client terminal differs as well as the vector mode. The privileged vector modes may be either the Infrared handset channel or the bluetooth channel for convenience reasons.

Figure 5B:
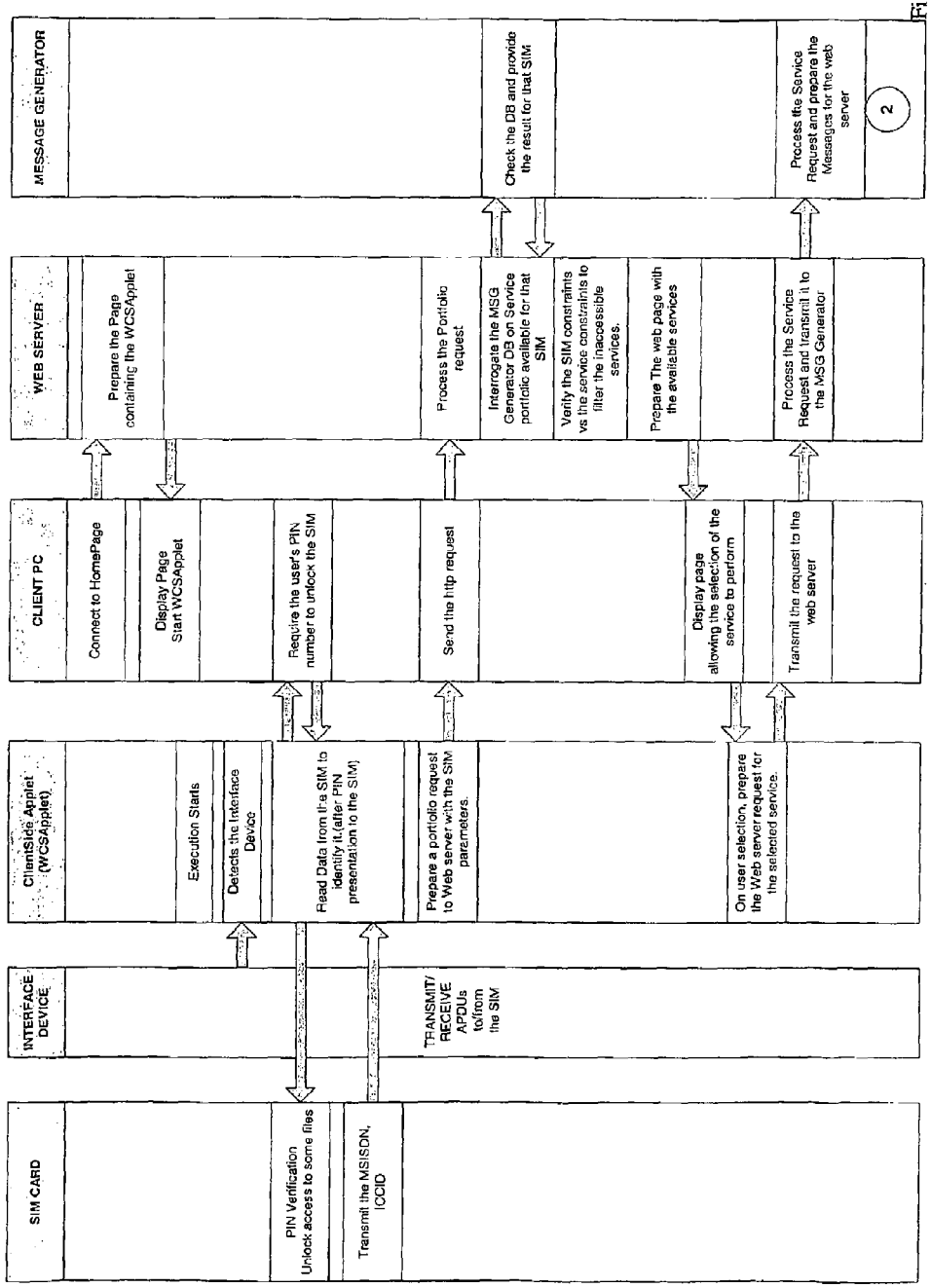
Figure 5C:
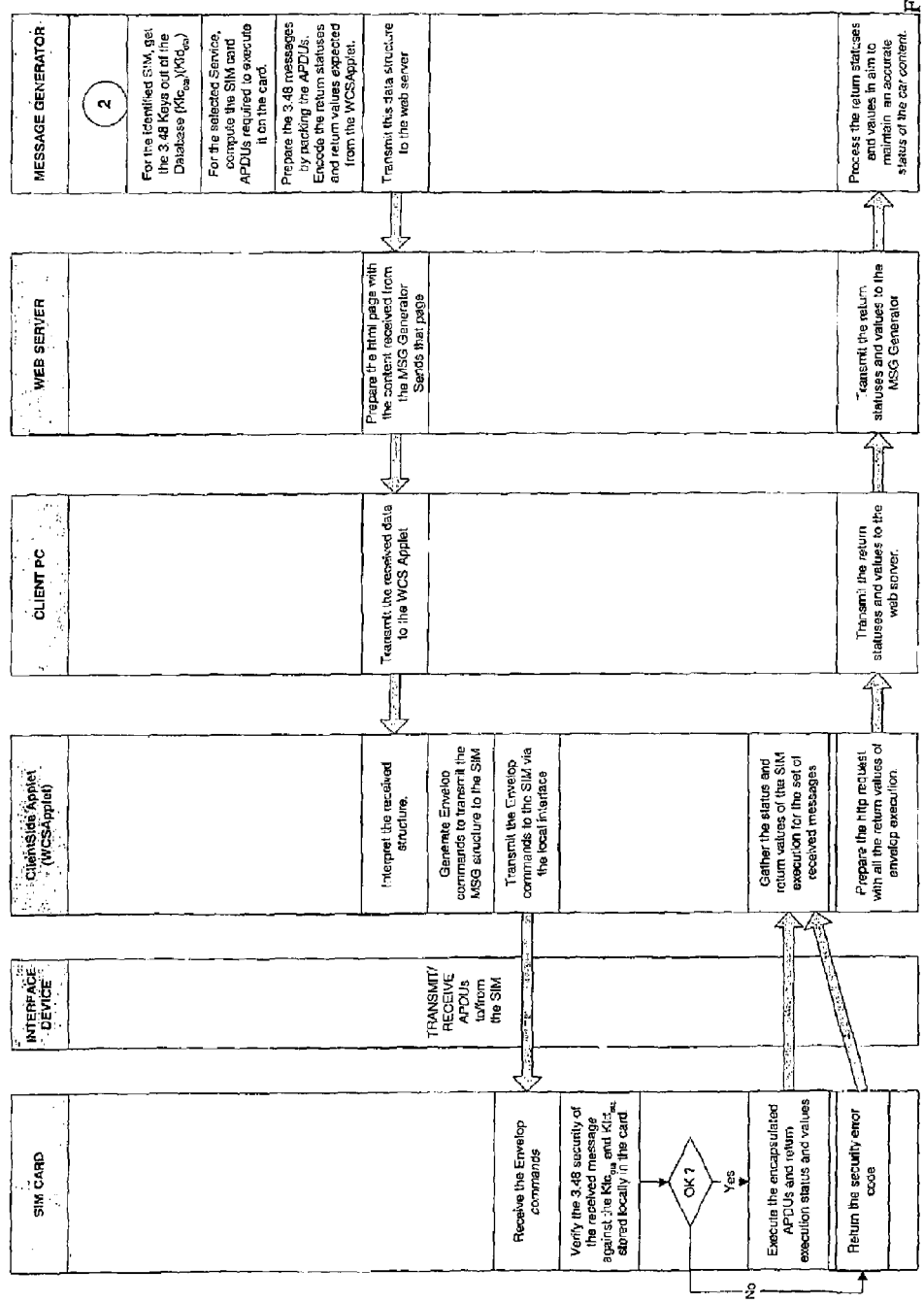

FIG. 5A, 5B, 5C are sequence diagrams of operations for Access to SIM Cards services via a Web connection. The table describes the sequence of operations occurring for the application described in above section "Application of the invention. Access to SIM card services via a web connection". Each operation can be executed by one of the following components:

The SIM Card
The Vector device
The middleman applet
The client PC
The web server
The message generator The description hereinbefore illustrates the following features:

A system comprises a first communication device and a second communication device. The first communication device is arranged to communicate with the second communication device via a communication network using a first communication protocol. The first communication device is arranged to send a message to the second communication device via the communication network using the first communication protocol. The message is designed for a second communication protocol. The second communication device is arranged to send the message to a third communication device. The third communication device is being arranged to understand the second communication protocol.

The second communication device can be implemented in many different manners. In the description hereinbefore, the second communication device is a personal computer arranged to communicate with a SIM card. The second communication device can also be a Personal Digital Assistant or any other communication device, which is preferably arranged to communicate with an integrated circuit card or any other device arranged to understand the second communication protocol.

The message can be a text message or a video message or a multimedia message.

The first communication protocol can be an IP based protocol (IP=Internet Protocol) or any other type of protocol which is different from the second communication protocol.

The second communication protocol can be a GMS based protocol, UMTS based protocol, a GPRS based protocol or any communication protocol that is different from the first protocol.

We can also imagine that the second communication device has the same functionalities than the first communication device so that they are arranged to exchange messages designed for the second communication protocol using the first communication protocol. We can also create a fleet of devices arranged to exchange messages designed for the second communication protocol using the first communication protocol.

The invention claimed is:

1. A system comprising:
   a server;
   a personal computer;
   an integrated circuit card; and
   a vector device connected between the personal computer and the integrated circuit card;
   the server being arranged to send a message destined to the integrated circuit card to the personal computer via a communication network using the IP based protocol wherein the personal computer is arranged to:
      send the message to the integrated circuit card over a local communication channel between the PC and the integrated circuit card via the vector device;
   the integrated circuit card being arranged to understand the Global System for Mobile communications (GSM), Universal Mobile Telecommunication System (UMTS) or General Packet Radio Services (GPRS) based protocol formats;
   the messages being:
      constructed by the server according to Global System for Mobile communications (GSM), Universal Mobile Telecommunication System (UMTS) or General Packet Radio Services (GPRS) based protocol formats;
      formatted by the server for an IP based protocol;
      and encrypted and/or signed by server keys kept in a secure storage area of the server and the integrated circuit card only.

2. The system according to claim 1, wherein the Global System for Mobile communications (GSM), Universal Mobile Telecommunication System (UMTS) or General Packet Radio Services (GPRS) based protocol is part of the European Telecommunications Standards Institute (ETSI) Global System for Mobile Communications (GSM) 3.48 standard.

3. The system according to claim 1 wherein the message is a Short Message Service (SMS) or a Multimedia Service (MMS).

4. The system according to claim 1 wherein the personal computer is a Personal Data Assistant (PDA) or a mobile telephone.

5. The server of claim 1 wherein the server further comprises:
   a secure physical area containing:
      a database containing keys for Subscriber Identity Module (SIM) cards of a subscriber's Subscriber Identity Module (SIM) cards;
      a secure Short Message Service (SMS) generator; and
      a web server for transmitting the secure Short Message Service (SMS) messages over the Internet.

6. The system of claim 1 wherein the local communication channel is selected from infra-red communication between the PC and the integrated circuit card, http communication between the PC and the integrated circuit card, and Bluetooth communication between the PC and the integrated circuit card.

7. A system comprising:
   a server;
   a personal computer; and
   an integrated circuit card;
   the server being arranged to send a message containing an applet to be executed by the integrated circuit card and destined for the integrated circuit card to the personal computer via a communication network using the IP based protocol wherein the personal computer is arranged to:
      send the message to the integrated circuit card via a vector device;
   the integrated circuit card being arranged to understand the Global System for Mobile communications (GSM), Universal Mobile Telecommunication System (UMTS) or General Packet Radio Services (GPRS) based protocol formats;
   the messages being:
      constructed by the server according to Global System for Mobile communications (GSM), Universal Mobile Telecommunication System (UMTS) or General Packet Radio Services (GPRS) based protocol formats and containing a sequence of APDU instructions to be executed by the integrated circuit card;
      formatted by the server for an IP based protocol;
      and encrypted and/or signed by server keys kept in a secure storage area of the server and the integrated circuit card only.

8. The system according to claim 1 wherein the vector device is a smart card reader connected to a serial port of the personal computer.

9. The system according to claim 1 wherein the vector device is a smart card reader connected to a Universal Serial Bus (USB) port of the personal computer.

10. The system according to claim 1 wherein the vector device is an infrared enabled mobile handset and wherein the message is transmitted from the personal computer to the mobile handset over an infrared link between the personal computer and the mobile handset.

11. The system according to claim 1 wherein the vector device is a Bluetooth® enabled mobile handset and wherein the message is transmitted from the personal computer to the mobile handset over a Bluetooth connection between the personal computer and the mobile handset.

12. The system according to claim 1 wherein the vector device is a USB cable and the SIM card is a USB enabled SIM and wherein the message is transmitted from the personal computer to the mobile handset over an infrared link between the personal computer and the mobile handset.

13. The system according to claim 1 wherein the vector device is a contactless reader and the SIM card comprises a dual mode interface.

14. The system according to claim 7 wherein the vector device is a smart card reader connected to a serial port of the personal computer.

15. The system according to claim 7 wherein the vector device is a smart card reader connected to a Universal Serial Bus (USB) port of the personal computer.

16. The system according to claim 7 wherein the vector device is an infrared enabled mobile handset and wherein the message is transmitted from the personal computer to the mobile handset over an infrared link between the personal computer and the mobile handset.

17. The system according to claim 7 wherein the vector device is a Bluetooth® enabled mobile handset and wherein the message is transmitted from the personal computer to the mobile handset over a Bluetooth connection between the personal computer and the mobile handset.

18. The system according to claim 7 wherein the vector device is a USB cable and the SIM card is a USB enabled SIM and wherein the message is transmitted from the personal computer to the mobile handset over an infrared link between the personal computer and the mobile handset.

19. The system according to claim 7 wherein the vector device is a contactless reader and the SIM card comprises a dual mode interface.

* * * * *